(12) United States Patent
Igawa et al.

(10) Patent No.: US 9,706,080 B2
(45) Date of Patent: Jul. 11, 2017

(54) IMAGE PROCESSING APPARATUS AND IMAGE PROCESSING METHOD

(71) Applicants: Hiroyuki Igawa, Kanagawa (JP); Hideki Kamaji, Kanagawa (JP)

(72) Inventors: Hiroyuki Igawa, Kanagawa (JP); Hideki Kamaji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/955,990

(22) Filed: Dec. 1, 2015

(65) Prior Publication Data
US 2016/0155031 A1   Jun. 2, 2016

(30) Foreign Application Priority Data

| Dec. 2, 2014 | (JP) | ................... 2014-244234 |
| Mar. 19, 2015 | (JP) | ................... 2015-056398 |
| Mar. 31, 2015 | (JP) | ................... 2015-071581 |

(51) Int. Cl.
*G06K 15/02* (2006.01)
*G06K 15/14* (2006.01)
*H04N 1/405* (2006.01)
*H04N 1/40* (2006.01)

(52) U.S. Cl.
CPC ....... *H04N 1/4051* (2013.01); *G06K 15/1881* (2013.01)

(58) Field of Classification Search
CPC ........... G06K 15/1822; G06K 15/1881; G06K 15/1877; G06K 15/14; H04N 1/4051
See application file for complete search history.

(56) References Cited

U.S. PATENT DOCUMENTS

| 5,555,102 A * | 9/1996 | Dalton ................. H04N 1/4051 358/3.14 |
| 6,646,759 B1 * | 11/2003 | Koga ................. G06K 15/1822 358/1.9 |
| 2015/0054866 A1 * | 2/2015 | Hayashi ............... H04N 1/4051 347/9 |
| 2016/0034794 A1 | 2/2016 | Igawa et al. |
| 2016/0155031 A1 | 6/2016 | Igawa et al. |

FOREIGN PATENT DOCUMENTS

| JP | 2012-003180 | 1/2012 |
| JP | 2016034128 A | 3/2016 |
| JP | 2016111667 A | 6/2016 |

* cited by examiner

*Primary Examiner* — Quang N Vo
(74) *Attorney, Agent, or Firm* — Duft Bornsen & Fettig LLP

(57) ABSTRACT

An image processing apparatus stores a first dither pattern group that includes dither patterns each corresponding to a gradation value in a first range and formed by line screens in which widths of lines are increased with an increase in the gradation value, a second dither pattern group that includes dither patterns each corresponding to a gradation value in a second range higher than the gradation value in the first range, and formed by void dot screens in which number of dots is increased and void regions surrounded by the dots are decreased with an increase in the gradation value, and a third dither pattern group that includes dither patterns for switching from the line screen to the void dot screen, switching to the void dot screen being completed before a first reference gradation value at which an image defect occurs for received image data is reached.

4 Claims, 17 Drawing Sheets

FIG.17
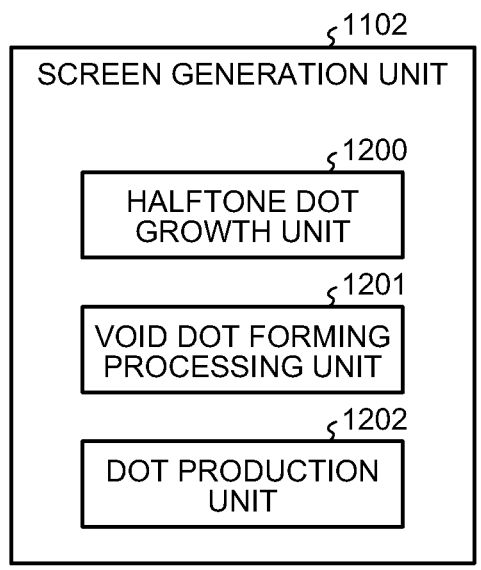
FIG.18
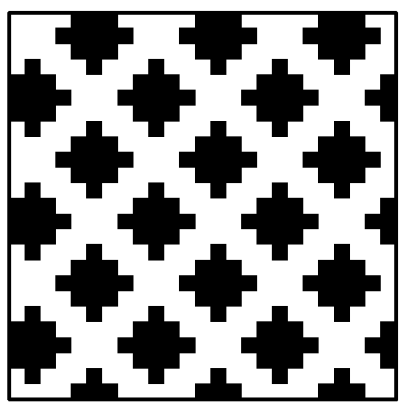 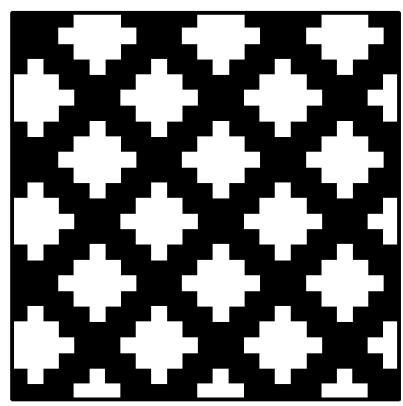
(A) DOT SHAPE         (B) VOID DOT SHAPE

HALFTONE DOT
SHAPE AND SCREEN
ANGLE

FIG.25
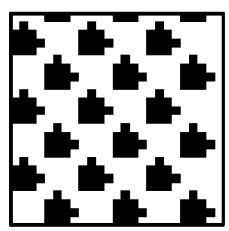
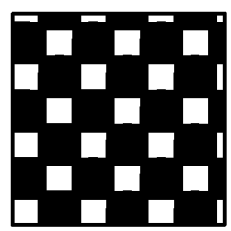
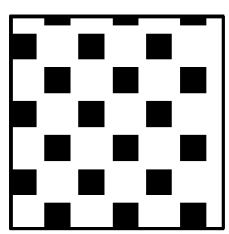
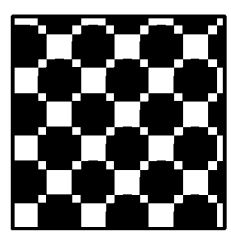
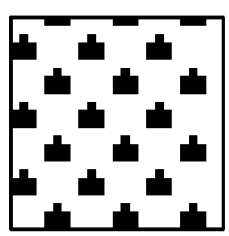
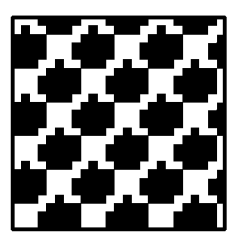
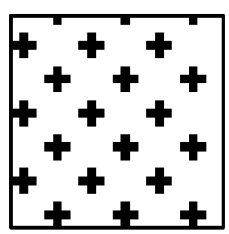
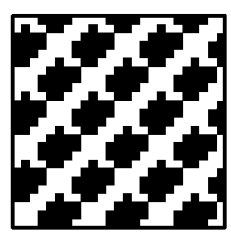
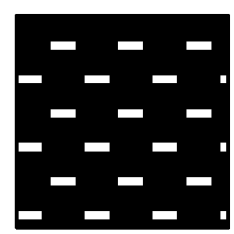
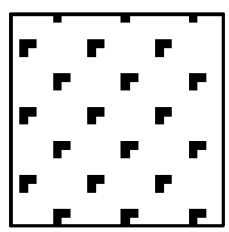
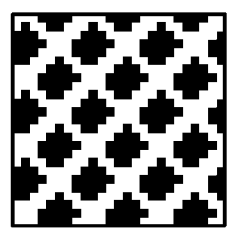
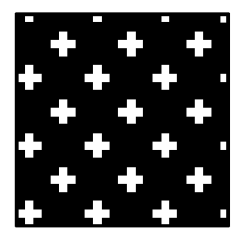
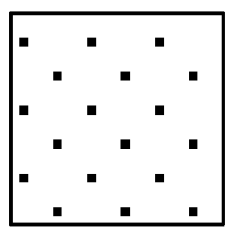
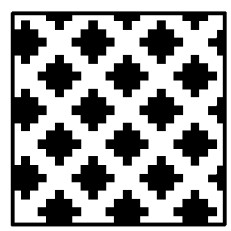
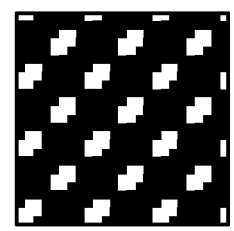

ated. Various techniques have been employed so as to bring the image stability
IMAGE PROCESSING APPARATUS AND IMAGE PROCESSING METHOD

CROSS-REFERENCE TO RELATED APPLICATION

The present application claims priority to and incorporates by reference the entire contents of Japanese Patent Application No. 2014-244234 filed in Japan on Dec. 2, 2014, Japanese Patent Application No. 2015-056398 filed in Japan on Mar. 19, 2015, and Japanese Patent Application No. 2015-071581 filed in Japan on Mar. 31, 2015.

BACKGROUND OF THE INVENTION

1. Field of the Invention

The present invention relates to an image processing apparatus and an image processing method.

2. Description of the Related Art

Electrophotography is generally inferior to offset printing in image stability in image formation. Various techniques, thus, have been employed so as to bring the image stability in the electrophotography close to that in the offset printing.

One of the different points between the electrophotography and the offset printing is gradation expression. The electrophotography expresses a half tone gradation in a pseudo manner by performing image processing such as dither processing using dither patterns such as a line screen and a dot screen on image data.

In the electrophotography, the dot screen achieves high image stability in low gradation values and high gradation values, but achieves low image stability in intermediate gradation values. In contrast, in the electrophotography, the line screen achieves high image stability in the intermediate gradation values, but achieves low image stability in the high gradation values. As a result, high image stability is not achieved in a certain gradation even if both of the dot screen and the line screen are used. For solving such a problem, a hybrid screen technique is known that uses the dot screen and the line screen by switching them in accordance with a range of gradation values in gradation processing, for example.

For example, Japanese Patent Application Laid-open No. 2012-3180 discloses a technique in which the line screen is used in a range of intermediate gradation values while a void dot screen is used in a range of high gradation values in order to use advantages of the dot screen and the line screen. The line screen has a disadvantage in that the width of a toner non-adhesion region (i.e., a region between lines) is reduced with an increase in gradation value, thereby causing a toner adhesion state in the non-adhesion region to be unstable. The technique disclosed in Japanese Patent Application Laid-open No. 2012-3180, thus, improves gradation performance in a range from an intermediate gradation to a high gradation by switching the dither pattern from the line screen to the void dot screen.

In such a conventional technique, however, image quality such as color stability deteriorates in a range of the gradation values in the switching from the line screen to the void dot screen in some cases. In addition, the conventional technique needs to store two different dither patterns, thereby requiring for a memory storing the dither patterns to have a large storage capacity. Furthermore, the conventional technique needs to perform dot re-arrangement processing for each dot array at the adjacent regions of the two different types of dither patterns, thereby requiring a time for the image processing.

The conventional technique does not achieve high image stability in a range of the gradation values in the switching from the line screen to the void dot screen in some cases. When an image defect such as banding unique to an apparatus occurs near the range of the gradation values, the low image stability causes the image defect to be more conspicuous in some cases.

In view of the above, there is a need to improve the image stability in a range from an intermediate gradation to a high gradation, and prevent an increase in memory capacity, an increase in image processing time, and an image defect from being more conspicuous even when both of the line screen and the void dot screen are used.

SUMMARY OF THE INVENTION

It is an object of the present invention to at least partially solve the problems in the conventional technology.

An image processing apparatus includes: a storage unit storing therein a first dither pattern group that includes a plurality of dither patterns each of which corresponds to a gradation value in a first range and that are formed by line screens being line patterns in which widths of lines are increased with an increase in the gradation value, a second dither pattern group that includes a plurality of dither patterns each of which corresponds to a gradation value in a second range higher than the gradation value in the first range, and that are formed by void dot screens being patterns in which number of dots is increased and void regions surrounded by the dots are decreased with an increase in the gradation value, and a third dither pattern group that includes a plurality of dither patterns for switching from the line screen to the void dot screen, switching to the void dot screen being completed before a first reference gradation value at which an image defect occurs for received image data is reached; an image determining unit configured to determine a gradation value for each certain area in the received image data; and a gradation processing unit configured to select a dither pattern corresponding to a value out of the first dither pattern group, the second dither pattern group, and the third dither pattern group.

An image processing apparatus includes: a first generation unit configured to produce a plurality of dither patterns each of which corresponds to a gradation value in a first range and that are formed by line screens being line patterns in which widths of lines are increased with an increase in the gradation value; a second generation unit configured to produce a plurality of dither patterns each of which corresponds to a gradation value in a second range higher than the gradation value in the first range, and that are formed by void dot screens being patterns in which number of dots is increased and void regions surrounded by the dots are decreased with an increase in the gradation value; and a third generation unit configured to produce a plurality of dither patterns for switching from the line screen to the void dot screen, switching to the void dot screen being completed before a first reference gradation value at which an image defect occurs for received image data is reached.

An image processing method includes: producing a plurality of dither patterns each of which corresponds to a gradation value in a first range and that are formed by line screens being line patterns in which widths of lines are increased with an increase in the gradation value; producing a plurality of dither patterns each of which corresponds to a gradation value in a second range higher than the gradation value in the first range, and that are formed by void dot screens being patterns in which number of dots is increased and void regions surrounded by the dots are decreased with an increase in the gradation value; and producing a plurality of dither patterns for switching from the line screen to the void dot screen, switching to the void dot screen being completed before a first reference gradation value at which an image defect occurs for received image data is reached.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a block diagram illustrating a functional structure of a screen generation unit;

FIG. 18 is an explanatory view illustrating a dot shape and an example of a void dot shape;

FIG. 25 is an explanatory view illustrating a conventional halftone dot screen growth method.

DETAILED DESCRIPTION OF THE PREFERRED EMBODIMENTS

The following describes embodiments of the invention in detail with reference to the accompanying drawings.

First Embodiment

Figure 1:
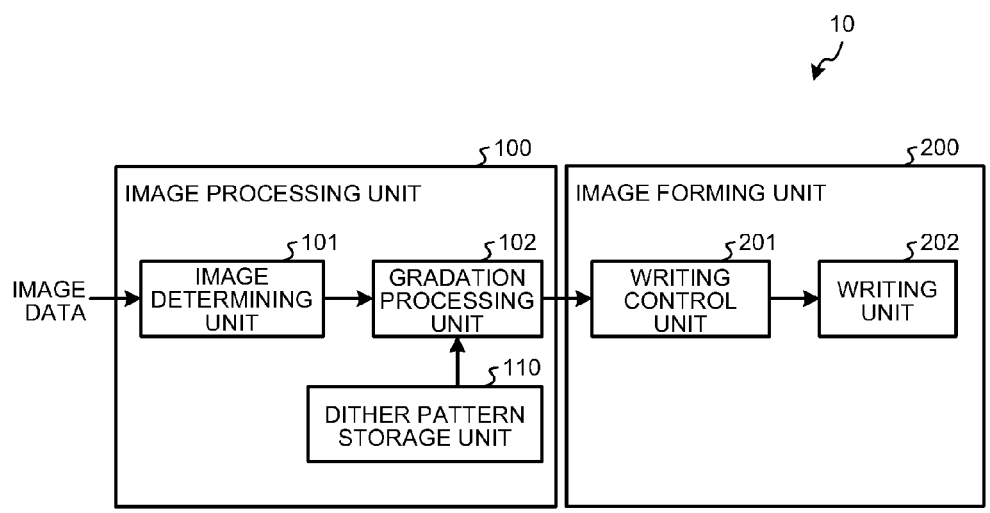
FIG. 1 is a block diagram illustrating a functional structure of an image forming apparatus in a first embodiment.

FIG. 1 is a block diagram illustrating a functional structure of an image forming apparatus in a first embodiment. This image forming apparatus 10 in the first embodiment is a copier, a printer, a facsimile, or a multifunction peripheral that includes at least one of copying, printing, and facsimile functions, for example. As illustrated in FIG. 1, the image forming apparatus 10 includes an image processing unit 100 and an image forming unit 200.

The image processing unit 100, which is mounted on a controller board of the image forming apparatus 10, for example, performs image processing on image data input thereto, and outputs the processed image data to the image forming unit 200. As illustrated in FIG. 1, the image processing unit 100 includes an image determining unit 101, a gradation processing unit 102, and a dither pattern storage unit 110.

The image determining unit 101 determines a gradation value for each certain area in the received image data.

The gradation processing unit 102 reads, for each certain area, the dither pattern corresponding to the gradation value determined by the image determining unit 101 from the dither pattern storage unit 110, and performs dither processing on the image data in accordance with the read dither pattern. The gradation processing unit 102 sends the image date after the dither processing to the image forming unit 200.

The dither pattern is data of a pattern that achieves a half tone gradation expression by dots of the image data in a pseudo manner. The gradation processing unit 102 reproduces a target gradation value by controlling a coloring amount (e.g., toner adhesion amount) per unit area in the pattern in the dither pattern corresponding to the gradation value. The gradation processing unit 102 sends the image date after the dither processing to the image forming unit 200.

The dither pattern storage unit 110 is a storage medium such as a hard disk drive (HDD) or a memory. The dither pattern storage unit 110 stores therein a first dither pattern group, a second dither pattern group, and a third dither pattern group, each of which includes a plurality of dither patterns.

In the dither pattern, adhesion regions to be colored by toner, for example, and non-adhesion regions not to be colored are regularly arranged with predetermined intervals therebetween. The non-adhesion region is described as a non-image region or a background region in some cases.

A dot screen is the dither pattern formed by a dot pattern in which a plurality of dots are arranged. The dot screen is the dither pattern formed by a pattern in which the adhesion regions are arranged in a matrix and the other regions are the non-adhesion regions. The dot screen has a pattern change in which the adhesion regions are enlarged in accordance with a certain rule (e.g., enlargement of a dot diameter or an increase in the number of dots) with an increase in gradation value.

A line screen is the dither pattern formed by a pattern including a plurality of lines tilted at a certain angle. The line screen is the dither pattern formed by a pattern in which the adhesion regions extending in a certain direction and the non-adhesion regions are alternately arranged linearly. The line screen has a pattern change in which the adhesion regions are enlarged in accordance with a certain rule (e.g., enlargement of the line width or an increase in the number of lines) different from that in the dot screen with an increase in gradation value.

A void dot screen is the dither pattern formed by a pattern in which the non-adhesion regions are arranged in a matrix and the other regions are the adhesion regions. In the void dot screen, the non-adhesion region surrounded by the dots serving as the adhesion region is a void region. The void dot screen has a pattern change in which the non-adhesion regions (void regions) are enlarged in accordance with a certain rule (e.g., enlargement of a dot diameter or an increase in the number of dots) with a decrease in gradation value. The screens in the respective dither pattern groups are described in detail later.

As illustrated in FIG. 1, the image forming unit 200 includes a writing control unit 201 and a writing unit 202. The writing unit 202 is an exposure device for a photoconductor. The exposure device is a laser diode (LD), for example. The writing control unit 201 produces an exposure instruction on the basis of the image data after the dither processing output from the image processing unit 100, and outputs the exposure instruction to the writing unit 202. The writing control unit 201 produces a pulse width modulation signal (PWM signal) for controlling an on/off time of light used for exposure in accordance with the dither pattern of the image data, and sends the PWM signal to the writing unit 202 as the exposure instruction. The writing unit 202 performs exposure on the photoconductor in accordance with the PWM signal. As a result, an image is formed on a recording medium by toner adhesion.

The following describes the details of the dither patterns stored in the dither pattern storage unit 110 of the image processing unit 100.

Figure 10:
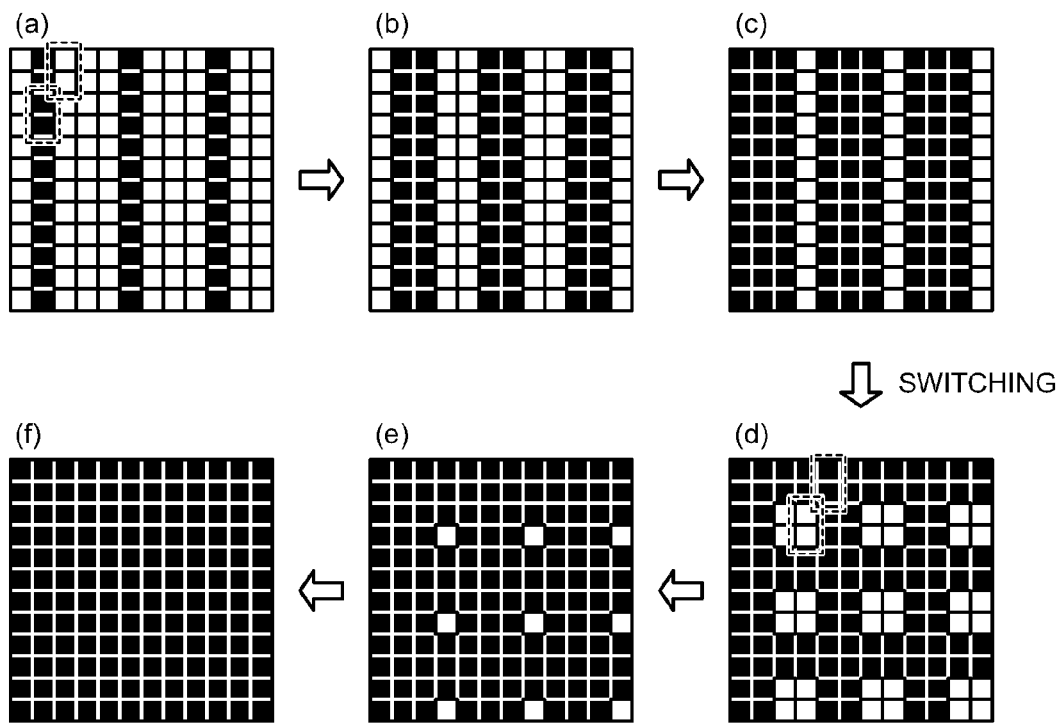
FIG. 10 is an explanatory view illustrating switching stages from a line screen to a void dot screen in a conventional technique.
Figure 11:
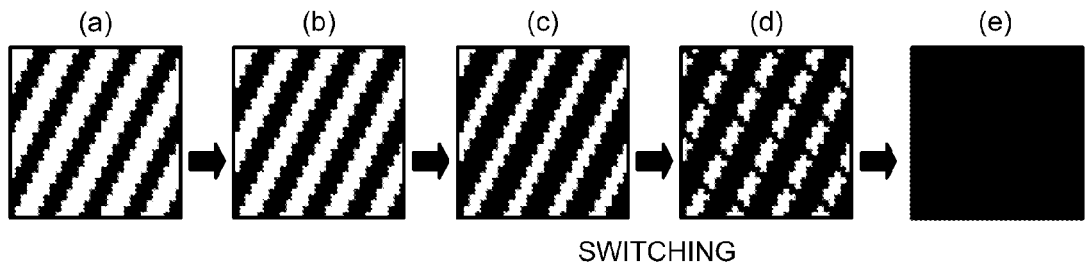
FIG. 11 is an explanatory view illustrating another example of the switching stages from the line screen to the void dot screen in the conventional technique.

FIG. 10 is an explanatory view illustrating switching stages from the line screen to the void dot screen in a conventional technique. FIG. 11 is an explanatory view illustrating another example of the switching stages from the line screen to the void dot screen in the conventional technique.

In the conventional technique, as illustrated from FIG. 10, the line screen is grown in a range of intermediate gradation values. In a range of high gradation values, the line pattern is switched to the void dot screen as illustrated at (d) in FIG. 10. The void dot screen is grown as illustrated from (d) to (f) in FIG. 10.

In the conventional technique, as illustrated from (a) to (c) in FIG. 11, the lines are grown in a range of intermediate gradation values in the same manner as the growth method of a typical line screen. When the gradation value is reached at a value at which the adhesion state in the non-image regions is unstable after the distance between lines is reduced, the dither pattern is switched from the line screen to the void dot screen as illustrated at (d) in FIG. 11. In a range of high gradation values after that gradation value, as illustrated from (d) to (e) in FIG. 11, the dots are grown such that the non-image regions are shrunk in the same manner as the growth method of typical void dot screen. When the line screen and the dot screen are adjacent to each other, the adjacent dots are re-arranged.

The following is the reason why the dither pattern is switched in the image processing in the conventional technique. The following describes the line screen and the dot screen, which are the typical image processing patterns in electrophotography.

A growth order in the line screen with an increase in gradation is determined from a pixel closer to a virtual line referred to as a center line to a pixel far from the center line. This growth order, thus, causes the line to be widened and the distance between lines to be reduced with an increase in gradation value. The line screen has a sufficient distance between lines from a low gradation to an intermediate gradation. As a result, a toner adhesion area is highly stable. In contrast, the line screen has an insufficient distance between lines in high gradation values. As a result, an unstable state occurs in which toner sometimes adheres and sometimes does not adhere on the non-adhesion regions (non-image regions). In other words, the line screen has a disadvantage in that the width of the non-adhesion region (the region between lines) is reduced with an increase in gradation value, thereby causing a toner adhesion state in the non-adhesion region to be unstable.

A growth order in the dot screen with an increase in gradation is determined from a pixel closer to the pixel referred to as a growth center to a peripheral pixel. In low gradation values in which the dot screen has a sufficient distance between dots, the toner adhesion area is highly stable. In intermediate gradation values in which the dot screen has an insufficient distance between dots, a toner non-adhesion area between dots is unstable. In high gradation values, the use of the screen including the void dots the minor diameter of which are enlarged makes it possible to more stabilize the toner adhesion area than that of the line screen.

From the features of the respective screens, it is preferable for stabilizing the toner adhesion area to perform the gradation processing using the line screen in a range of the intermediate gradation values and the void dot screen in a range of the high gradation values.

The conventional technique, thus, switches the dither pattern from the line screen to the void dot screen so as to make up for the disadvantages of the line screen and the dot screen, thereby further improving the image stability in a range from the intermediate gradation values to the high gradation values than the case where only a single screen (dither pattern) is used out of the line screen and the dot screen.

The conventional technique, however, does not take into consideration the image stability before and after the switching of the dither pattern, thereby causing an image to be unstable. In addition, the two types of dither patterns of the line screen and the void dot screen need to be stored in a storage unit, thereby requiring for a memory storing therein the dither patterns to have a large capacity. Furthermore, the dot re-arrangement processing needs to be performed for each dot array at the adjacent regions of the two different types of dither patterns, thereby requiring a time for the image processing.

Figure 12:
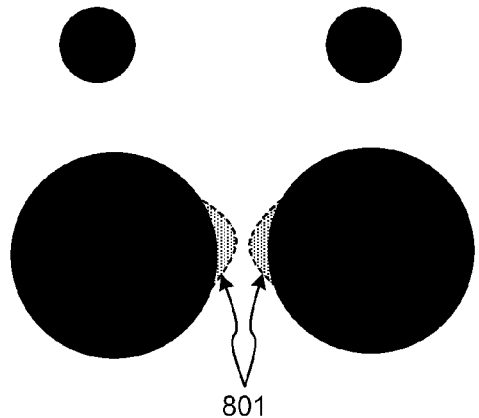
FIG. 12 is a schematic diagram illustrating an example of toner adhesion on a non-image region in relation to a distance between dots.
Figure 13:
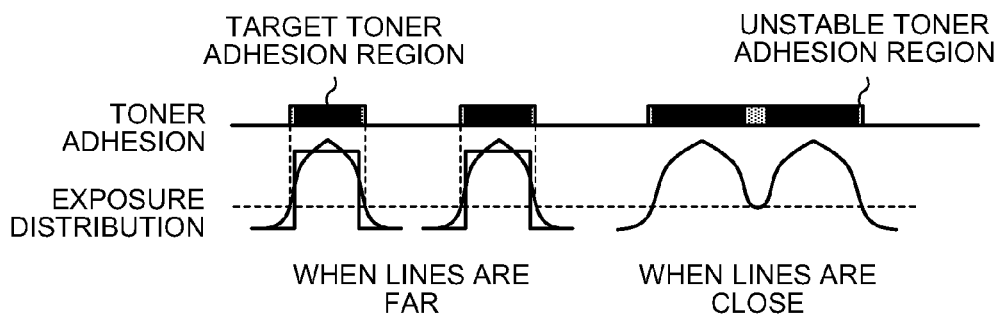
FIG. 13 is a schematic diagram to explain a relation between the distance between dots and the toner adhesion.

FIG. 12 is a schematic diagram illustrating an example of toner adhesion on the non-image region in relation to the distance between the dots. FIG. 13 is a schematic diagram to explain a relation between the distance between the dots and the toner adhesion.

In the electrophotography, when the distance between dots or the distance between lines is close as illustrated in FIGS. 12 and 13, exposure distributions of adjacent dots or adjacent lines overlap with each other at their ends to cause a certain exposure intensity to occur in the non-image region (the background region), thereby causing toner to unexpectedly adhere on the region (a region 801 in FIG. 12) in some cases. This causes the area of toner adhesion to vary, thereby adversely affecting image quality such as color stability and graininess.

The first embodiment uses the dither pattern having a pattern including a dot arrangement that prevents the occurrence of such adverse affects in the non-image regions (non-adhesion regions, or the background regions) and stabilizes the toner adhesion area, when the gradation processing is performed using the line screen in a range of the intermediate gradation values and the dot screen in a range of the high gradation values, and then the switching from the line screen to the void dot screen is performed in the same manner as the conventional technique. As a result, the first embodiment makes it possible to improve the stability in the toner adhesion area in a range from the intermediate gradation values to the high gradation values to output an image having a high image quality in all of the gradation values. The following describes the first embodiment in detail.

Referring back to FIG. 1, in the embodiment, the dither pattern storage unit 110 stores therein a plurality of dither patterns, which are described below, in each of the first dither pattern group, the second dither pattern group, and the third dither pattern group. The respective dither patterns in the dither pattern groups are stored in the dither pattern storage unit 110 in association with the gradation values.

The first dither pattern group includes a plurality of dither patterns each of which corresponds to a gradation value in an intermediate gradation (a first range) and that are formed by line screens being line patterns in which the widths of the lines are increased with an increase in gradation value.

The second dither pattern group includes a plurality of dither patterns each of which corresponds to a gradation value in a high gradation (a second range) and that are formed by void dot screens being patterns in which the number of dots is increased and the void regions serving as the non-adhesion regions are decreased with an increase in gradation value.

The third dither pattern group includes a plurality of dither patterns used for the switching from the line screen in the first dither pattern group to the void dot pattern in the second dither pattern group. The third dither pattern group includes the dither patterns for respective gradation values, formed by patterns in which adjacent lines come to be connected with an increase in the widths of the lines in such a manner that the connections come to be gradually connected from the tips of the connections each having a tapered shape toward the tip thereof with an increase in the gradation value from a reference gradation value β.

The reference gradation value β corresponds to the second reference gradation value in the invention. The reference gradation value β is the gradation value from which the switching from the line screen to the void dot screen starts and that corresponds to the minimum distance between lines, which distance allows the adhesion area of the non-image region between lines to be stable.

The third dither pattern group includes the multiple dither patterns that complete the switching from the line screen to the void dot screen before a reference gradation value γ at which an image defect occurs for the received image data is reached. The reference gradation value γ corresponds to the first reference gradation value in the invention, which is exemplarily described with reference to FIG. 8.

The gradation value at which an image defect readily occurs depends on an environment including the type of image forming apparatus and an output setting, and the type of image defect. If a range of the gradation values in which the image defect readily occurs is grasped before an image is formed, the overlapping can be prevented between a gradation value at which the image is unstable in the switching from the line screen to the void dot screen and a range of gradation values in which the image defect readily occurs. As a result, the image defect can be prevented from being more conspicuous.

For example, the gradation value at which the image quality is worst due to the image defect is experimentally calculated by measuring charts of output images having various densities (input area rates) input according to respective environments. The range of gradation values is then obtained in which the image defect of not being ignorable occurs. The reference gradation value β (second reference gradation value), at which the switching from the line screen to the void dot screen starts, is set to the gradation value smaller than the obtained range. As a result, the switching from the line screen to the void dot screen and the range of the gradation values in which the image defect readily occurs do not overlap with each other.

Specifically, under certain output conditions in the image forming apparatus, banding, which is an example of the image defect, is assumed to cause the image quality to be worst at the gradation value of 120 and the image quality is assumed to worsen to be a degree of not being ignorable at a gradation value in a range from 100 to 150 or more, for example. In this case, the switching to the void dot screen starts at the reference gradation value β that causes the switching to be completed before the gradation value reaches 100.

The third dither pattern group includes the dither patterns formed by patterns in which when adjacent lines come to be connected at their tips in a direction perpendicular to the extending direction of the lines, the distance between the lines is equal to the diameter of the void region in the void dot pattern.

Figure 2:
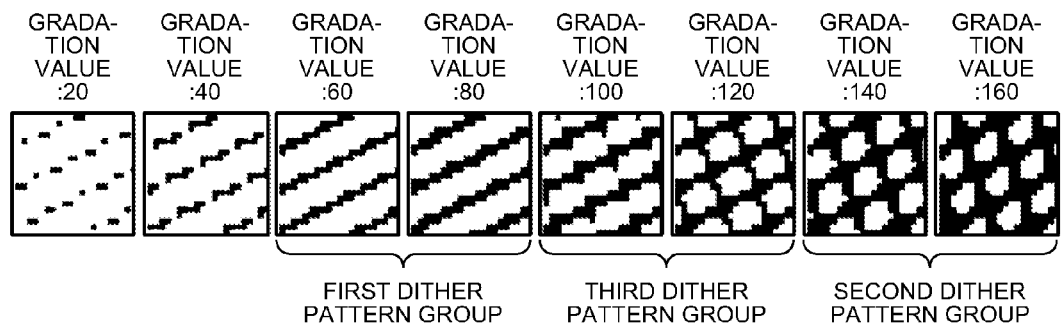
FIG. 2 is a schematic diagram illustrating switching stages from a line screen to a void dot screen in the first embodiment.
Figure 3:
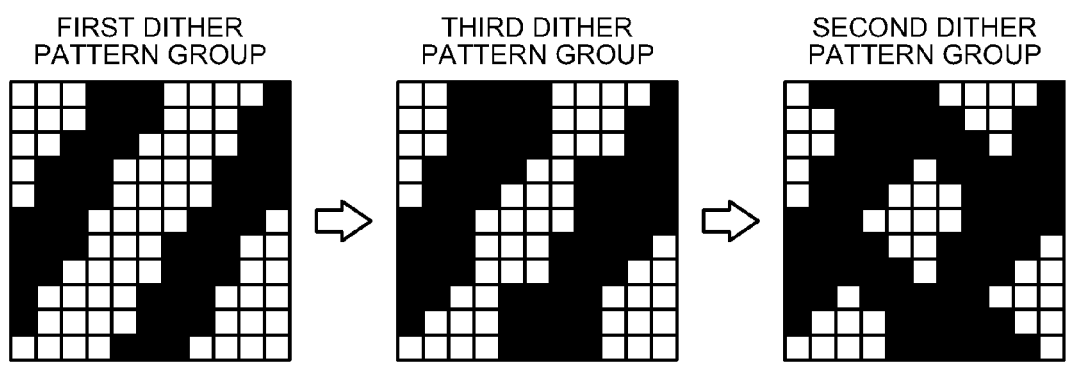
FIG. 3 is a schematic diagram illustrating the switching from the line screen to the void dot screen in the first embodiment.

FIG. 2 is a schematic diagram illustrating the switching stages from the line screen to the void dot screen in a first embodiment. FIG. 3 is a schematic diagram illustrating the switching from the line screen to the void dot screen in the second embodiment.

In the second embodiment, the first dither pattern group includes the multiple dither patterns that correspond to the respective gradation values and in which the lines are grown (the widths of the lines are increased) with an increase in gradation value until the gradation value reaches the certain reference gradation value β in a range of the intermediate gradation (in FIG. 2, the gradation values of 60 and 80) in the same manner as the typical line screen, as illustrated in FIGS. 2 and 3.

When the gradation value exceeds the reference gradation value β (in FIG. 2, the gradation value of 100), the dither patterns start for the stages of the switching from the line screen to the void dot screen, which dither patterns are included in the third dither pattern group. Specifically, as illustrated in FIGS. 2 and 3, the third dither pattern group includes the multiple dither patterns corresponding to the respective gradation values. In each dither pattern, each line is provided with protrusions (projections) each tapered from the base thereof toward the tip thereof with intervals determined by the number of screen lines.

When the gradation value is further increased (in FIG. 2, the gradation value of 120), the third dither pattern group includes the multiple dither patterns corresponding to the respective gradation values. In dither patterns, the protrusion shapes are grown such that adjacent lines come to be connected in the direction perpendicular to the extending direction of the lines (i.e., the protrusions facing each other come to be connected) and the area of unstable toner adhesion is reduced, as illustrated in FIGS. 2 and 3. The growing is performed such that the diameter of the void dot is equal to the distance between the lines when the lines are connected in the direction perpendicular to the extending direction of the lines.

Figure 4:
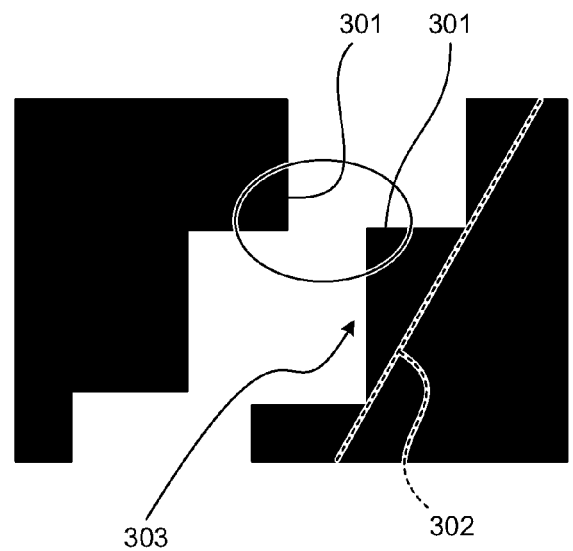
FIG. 4 is an explanatory view of connections between lines in a third dither pattern group in the first embodiment.

FIG. 4 is an explanatory view of the connections between lines in the third dither pattern group in the second embodiment. As illustrated in FIG. 4, each line of the dither pattern included in the third dither pattern group has protrusions (projections) 303, each of which has a tip 301 as the end of the tapered shape thereof and a base 302, which is the larger end of the tapered shape. Each line of the dither pattern included in the third dither pattern group has the protrusions having a tapered shape (or a triangle shape), the width of which is reduced from the base to the tip thereof. The lines come to be connected at their tips of the protrusions. The dither patterns are formed such that the tips 301 of the protrusions 303 of the lines facing with each other come to be connected as a result of the growth of the lines with a further increase in gradation value.

The growth of the lines, which are illustrated in FIG. 4, in the dither pattern included in the third dither pattern group reduces the area where toner adhesion is unstable. The line connection manner illustrated in FIG. 4 stabilizes highly the adhesion area of the non-image region between the protrusions, and the adhesion areas of the protrusions well. The line connection manner is, thus, the protrusion growth method with high image stability. The embodiment, thus, connects the protrusions using the line connection manner described with reference to FIG. 4.

Referring back to FIG. 2, when the gradation value reaches a range of the high gradation as a result of a further increase in gradation value (in FIG. 2, the gradation values of 140 and 160), the second dither pattern group includes a plurality of dither patterns corresponding to the respective gradation values. In each of the dither patterns, the dots are grown in such a manner that the grown dots shrink the non image regions in the same manner as the typical void dot screen.

Figure 14:
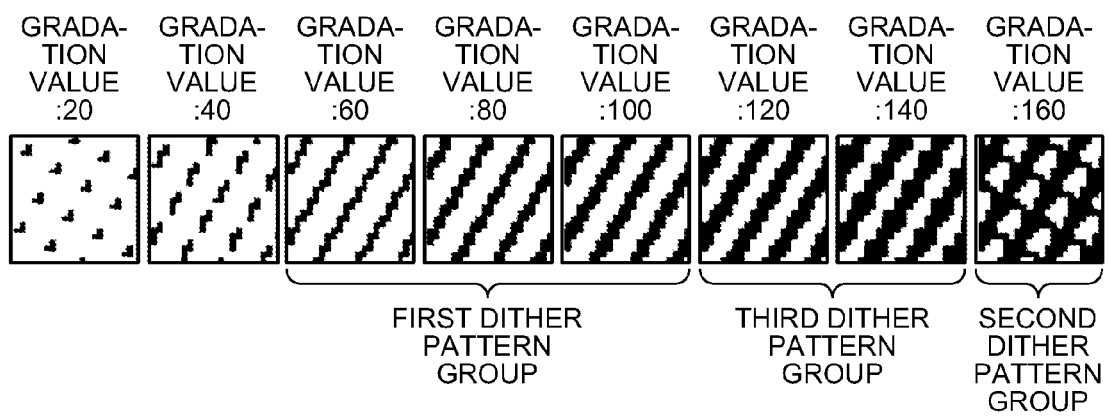
FIG. 14 is a schematic diagram illustrating the switching stages from the line screen to the void dot screen in the conventional technique.

The switching stages from the line screen to the void dot screen are compared between the first embodiment and the conventional technique. FIG. 14 is a schematic diagram illustrating the switching stages from the line screen to the void dot screen in the conventional technique.

As a result of a comparison between FIGS. 2 and 14, it can be understood that the switching from the line screen to the void dot screen is completed in the first embodiment at gradation value smaller than that at which the switching is completed in the conventional technique. Specifically, in the conventional technique, the first dither pattern group is used until the gradation value of 100. When the gradation value reaches the gradation value of 120 as a result of an increase in gradation value, the dither patterns start for the switching stages from the line screen to the void dot screen, which dither patterns are included in the third dither pattern group. When the gradation value reaches the gradation value of 160 as a result of a further increase in gradation value, the second dither pattern group is used.

In the first embodiment, the switching to the void dot screen is completed at the gradation value of 120, which gradation value is smaller than the gradation value of 140 at which the switching is competed in the conventional technique.

Figure 5:
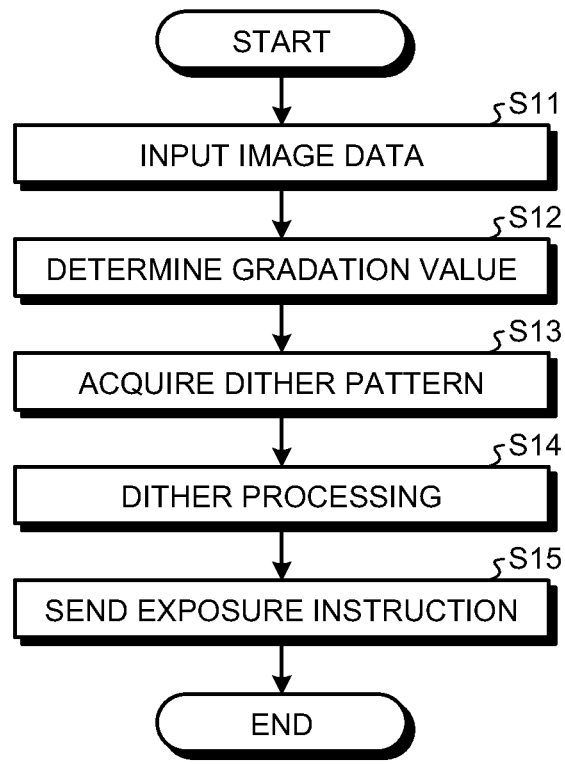
FIG. 5 is a flowchart illustrating an exemplary procedure of image forming processing according to the first embodiment.

The following describes the image forming processing performed by the image forming apparatus 10 thus structured in the first embodiment. FIG. 5 is a flowchart illustrating an exemplary procedure of the image forming processing according to the first embodiment.

The image processing unit 100 receives image data to be printed (step S11). The image determining unit 101 determines a gradation value for each certain area in the received image data (step S12). The gradation processing unit 102 acquires, from the dither pattern storage unit 110, a dither pattern corresponding to the gradation value determined by the image determining unit 101 (step S13). The gradation processing unit 102 performs the dither processing on the image data using the acquired dither pattern (step S14). The gradation processing unit 102 sends the image date after the dither processing to the image forming unit 200.

In the image forming unit 200, the writing control unit 201 receives the image data after the dither processing, produces a PWM signal serving as the exposure instruction on the basis of the image data (i.e., dither pattern), and sends the PWM signal to the writing unit 202 (step S15). As a result, a recording medium is output in which a half tone gradation is expressed.

The following describes a dither pattern generating apparatus that produces the dither patterns to be stored in the dither pattern storage unit 110. This dither pattern generating apparatus 500 in the embodiment has a hardware structure utilizing a typical computer. The dither pattern generating apparatus 500 includes a central processing unit (CPU), a storage device such as a read only memory (ROM) and a random access memory (RAM), an external storage device such as an HDD or a digital versatile disc (DVD), a display device such as a display, and an input device such as a keyboard and a mouse. The dither pattern generating apparatus 500 is not limited to be structured as described above. The dither pattern generating apparatus 500 may be provided inside the image forming apparatus 10 (e.g., in the image processing unit 100).

Figure 6:
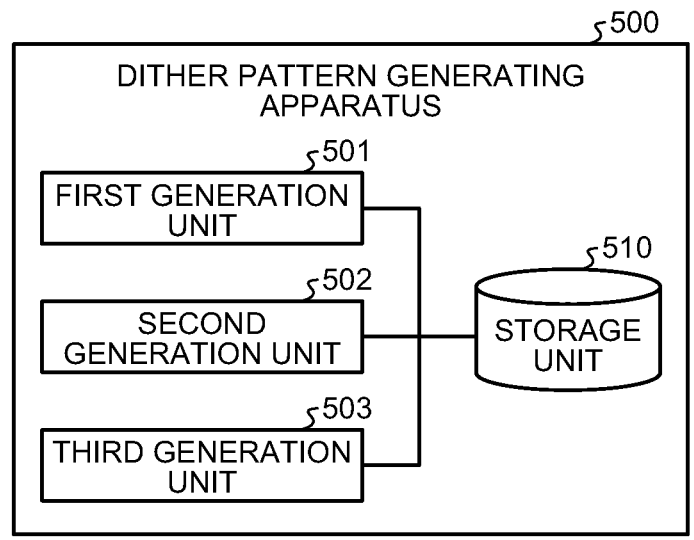
FIG. 6 is a block diagram illustrating a functional structure of a dither pattern generating apparatus in the first embodiment.

FIG. 6 is a block diagram illustrating a functional structure of the dither pattern generating apparatus 500 in the first embodiment. As illustrated in FIG. 6, the dither pattern generating apparatus 500 in the first embodiment mainly includes a first generation unit 501, a second generation unit 502, a third generation unit 503, and a storage unit 510.

The storage unit 510, which is a storage medium such as an HDD and a memory, stores therein the dither patterns produced by the first generation unit 501, the second generation unit 502, and the third generation unit 503.

Figure 7:
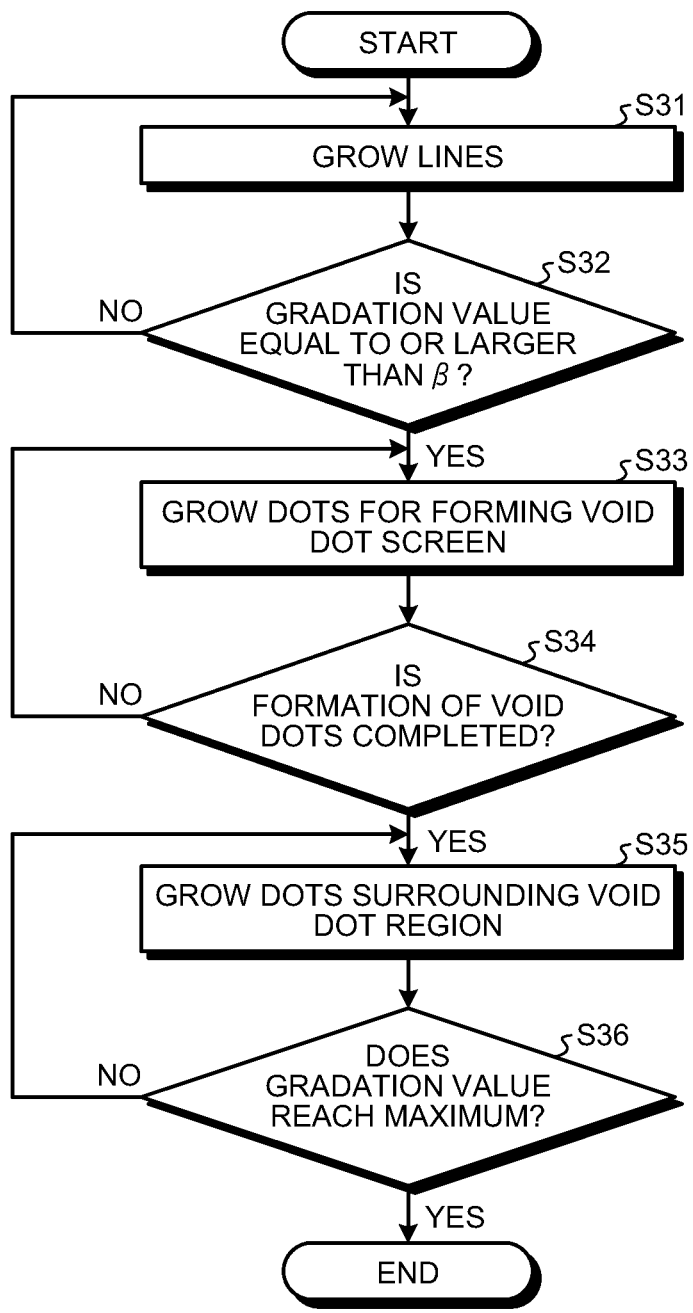
FIG. 7 is a flowchart illustrating an exemplary procedure of processing to produce the dither patterns in the first embodiment.

The following describes the processing performed by the first generation unit 501, the second generation unit 502, and the third generation unit 503 to produce the dither patterns. FIG. 7 is a flowchart illustrating an exemplary procedure of the processing to produce the dither patterns in the first embodiment.

The first generation unit 501 grows the lines in the line screen in accordance with an increase in gradation value in a range of the intermediate gradation values to produce the dither patterns included in the first dither pattern group (step S31). The first generation unit 501 produces the line screen, for each gradation value, in which the widths of the lines are increased, and stores the produced line screens, as the first dither pattern group, in the storage unit 510 in association with the respective gradation values.

The first generation unit 501 determines whether the gradation value is equal to or larger than the reference gradation value β (step S32). If the gradation value is smaller than the reference gradation value β (No at step S32), the processing returns to step S31, at which the first generation unit 501 produces the dither patterns included in the first dither pattern group.

If the gradation value is equal to or larger than the reference gradation value β (Yes at step S32), the third generation unit 503 starts the production of the dither patterns included in the third dither pattern group. The third generation unit 503 produces, for each gradation value, the dither pattern of a pattern in which the dots are grown such that each line is provided with protrusions (projections) each tapered toward the tip thereof with intervals determined by the number of screen lines, for a preparation to form the void dot screen (step S33). As a result of an increase in gradation value, the dither patterns are produced in which the protrusions of adjacent lines come to be connected at their tips of the protrusions. The third generation unit 503 stores, as the third dither pattern group, in the storage unit 510, the produced multiple dither patterns in association with the respective gradation values.

The third generation unit 503 determines whether the formation of the void dots is completed as a result of the production of the dither patterns in which the protrusions of adjacent lines come to be connected at their tips of the protrusions with an increase in gradation value (step S34). If the formation of the void dots is not yet completed (No at step S34), the third generation unit 503 repeats the processing at step S33.

If the formation of the void dots is completed (Yes at step S34), the second generation unit 502 produces, for each gradation value, the dither pattern in which the dots surrounding the void dot region are grown such that the short diameter is as large as possible and the peripheral length of the void dot is as small as possible to produce the dither patterns included in the second dither pattern group (step S35). The second generation unit 502 stores the produced dither patterns in the storage unit 510 as the second dither pattern group.

The second generation unit 502 determines whether the gradation value is maximum (step S36). If the gradation value is not yet maximum (No at step S36), the second generation unit 502 repeats the processing at step S35. As a result, the dots are grown until a solid image is formed. If the gradation value is maximum (Yes at step S36), the processing ends.

As a result, the multiple dither patterns included in the first dither pattern group, the second dither pattern group, and the third dither pattern group are produced in association with the respective gradation values, and stored in the storage unit 510. The dither patterns stored in the storage unit 510 are transferred to the dither pattern storage unit 110 of the image forming apparatus 10 by a user, for example.

The dither pattern groups are prepared that are formed using the screen growth method described above. As a result, the image stability can be increased in a range from the intermediate gradation to the high gradation without an increase in memory capacity, which increase is required by the conventional technique. The following describes how the image stability is improved in detail.

Figure 8:
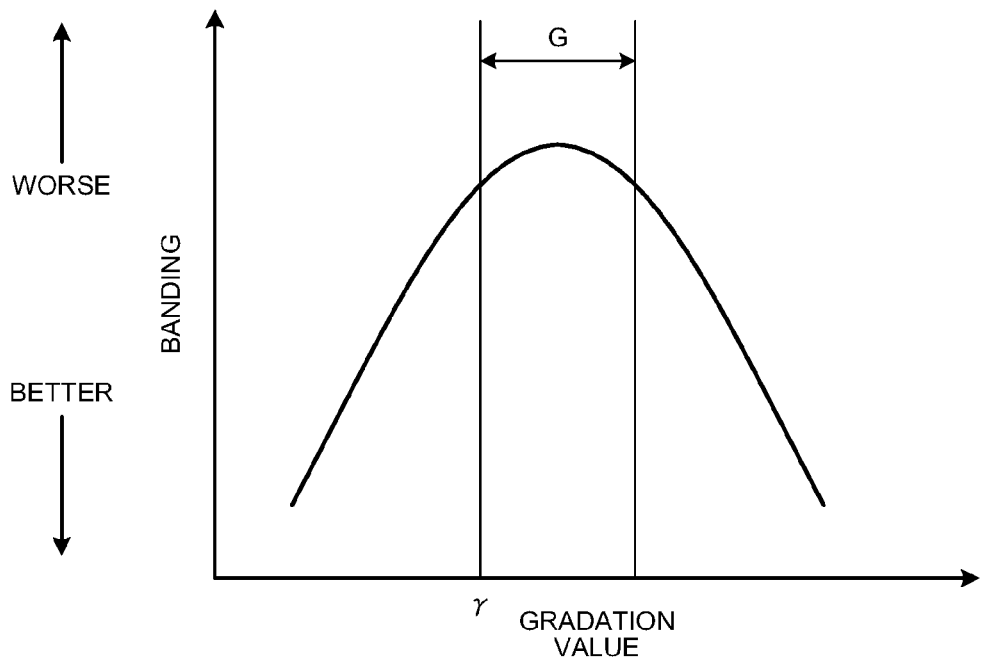
FIG. 8 is a graph illustrating a degree of banding in the image forming apparatus in the first embodiment.

The following describes an effect of the dither patterns in the first embodiment. The following is a case where banding, which is an example of the image defect, occurs. FIG. 8 is a graph illustrating a degree of the banding in the image forming apparatus 10 in the first embodiment. The gradation value at which the image quality deteriorates due to the banding depends on an environment including the type of the image forming apparatus and an output setting. Regardless of any environment, the higher the gradation value is increased up to a certain gradation value (the gradation value at which the image quality is worst), the more the degree of the banding worsens, i.e., the more frequently the banding occurs. After the gradation value (the gradation value at which the image quality is worst), the degree of the banding is lowered, i.e., the occurrence frequency of the banding tends to be reduced.

In FIG. 8, the abscissa axis represents the gradation value while the ordinate axis represents the degree of the banding (ranging from better to worse). As illustrated in FIG. 8, the degree of the banding is depicted as a parabola. A gradation value range G is a range of the gradation values in which the image quality deteriorates due to the banding. Specifically, the gradation value range G is a range of the gradation values in which the image defect of not being ignorable occurs. The gradation value at which the gradation value range G starts is, thus, the gradation value γ at which the image defect occurs.

Figure 9:
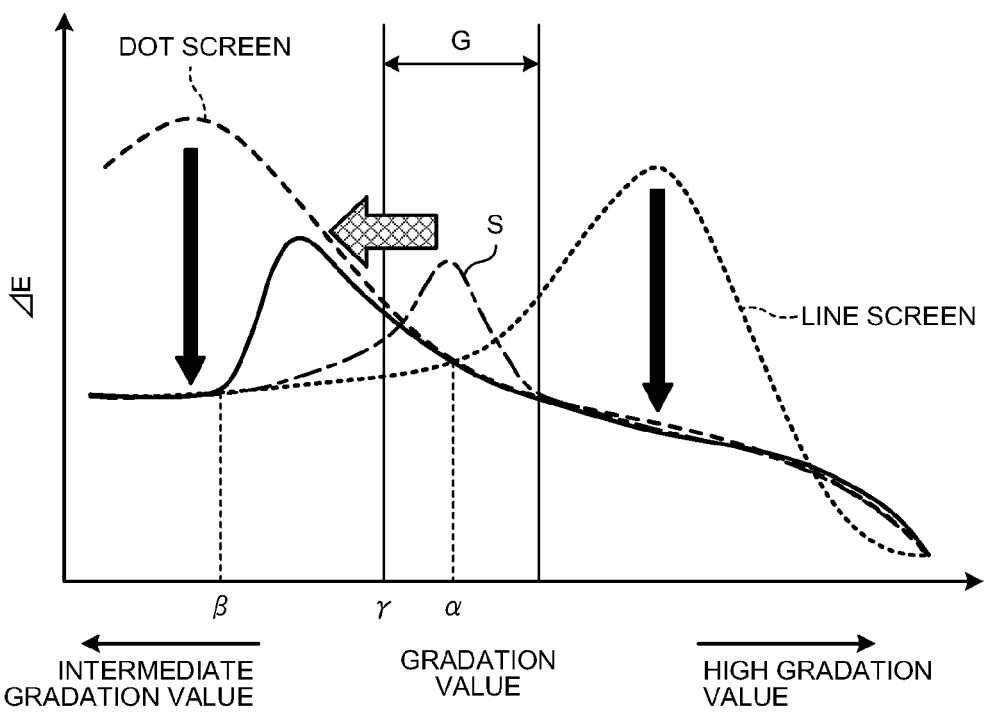
FIG. 9 is a graph to explain an effect of the dither patterns in the first embodiment.

FIG. 9 is a graph to explain an effect of the dither patterns in the first embodiment. In FIG. 9, the abscissa axis represents the gradation value while the ordinate axis represents a color difference ΔE in an average reference page. The larger the value of ΔE is, the more the image stability worsens. In FIG. 9, the actual line represents the result of the dither patterns in the first embodiment.

As illustrated in FIG. 9, the image stability is worse in the intermediate gradation values when the dot screen is used while the image stability is worse in a range from the intermediate gradation values to the high gradation values when the line screen is used. In FIG. 9, a gradation value α represents the gradation value at which the degrees of the color differences ΔE of the line screen and the void dot screen change to be opposite therebetween. The reference gradation value β is the gradation value at which the switching from the line screen to the void dot screen starts.

The image stability when the screens (dither patterns) in the first embodiment are used is lower than that in the conventional technique (the line screen) in relation to only α to β. The screens in the embodiment, however, largely improve the image stability in the gradation values in which the image stability is worse when the line screen and the void dot screen are used. As a whole (in a gradation value equal to or larger than the intermediate gradation value), the screens in the embodiment improve the image stability.

As illustrated in FIG. 9, when a screen S is used, the switching from the line screen to the void dot screen overlaps with the gradation value range G in which the image defect occurs for the image data. The overlap causes the image defect to be more conspicuous.

In the first embodiment, the switching from the line screen to the void dot screen starts at the reference gradation value β, and the switching to the void dot screen is completed before the reference gradation value γ at which the image defect of not being ignorable occurs for the received image data is reached (before the gradation value range G is reached). As a result, the gradation value at which the dither pattern is switched to the void dot screen and the range of the gradation values in which the image defect of not being ignorable occurs do not overlap with each other, thereby making it possible to prevent the image defect from being more conspicuous.

The conventional technique uses the two dither patterns by switching them at a certain area rate. The usage may cause a situation in which one dither pattern is applied to one region in adjacent regions in an image while the other dither pattern is applied to the other region in the adjacent regions. In such a case, the dots in the boundary are re-arranged such that the boundary does not unnaturally appear. The conventional technique, thus, requires the determination of the area rate between adjacent halftone gradations in an image and the processing to re-arrange the dots in the boundary in accordance with the determination result.

The first embodiment uses a series of dither patterns based on a single dither pattern, thereby requiring no determination of the area rate between the adjacent half tone gradations in the image and no processing to re-arrange the dots in accordance with the determination result. The first embodiment, thus, can further prevent an increase in image processing time than the conventional technique.

In the first embodiment, the dither pattern generating apparatus 500 produces the first dither pattern group, the second dither pattern group, and the third dither pattern group and stores them in the dither pattern storage unit 110. The first dither pattern group includes a plurality of dither patterns each of which corresponds to a gradation value in the intermediate gradation and that are formed by the line screens in which the widths of the lines are increased with an increase in gradation value. The second dither pattern group includes a plurality of dither patterns each of which corresponds to a gradation value in the high gradation and that are formed by void dot screens in which the number of dots is increased with an increase in gradation value. The third dither pattern group includes a plurality of dither patterns used for the switching from the line pattern to the void dot pattern. The dither patterns are formed by patterns in which adjacent lines come to be connected with an increase in the widths of the lines in such a manner that the connections come to be gradually connected from the tips of the connections each having a tapered shape toward the tip thereof with an increase in the gradation value from the reference gradation value β. The image forming apparatus 10 determines the gradation value for each certain area in the received image data, selects the dither pattern corresponding to the gradation value out of the first dither pattern group, the second dither pattern group, and the third dither pattern group stored in the dither pattern storage unit 110, and performs the image processing on the image data in accordance with the selected dither pattern. The embodiment can improve the image stability in a range from the intermediate gradation to the high gradation and prevent an increase in memory capacity and an increase in image processing time when both of the line screen and the void dot screen are used. The embodiment completes the switching from the line screen to the void dot screen before the reference gradation value γ at which the image defect such as the banding occurs is reached even when the image stability is poor in a range of the gradation values in which the dither pattern is switched from the line screen to the void dot screen. As a result, the gradation value at which the dither pattern is switched and the range of gradation values in which the image defect of not being ignorable occurs do not overlap with each other, thereby making it possible to prevent the image defect from being more conspicuous.

Second Embodiment

Figure 15:
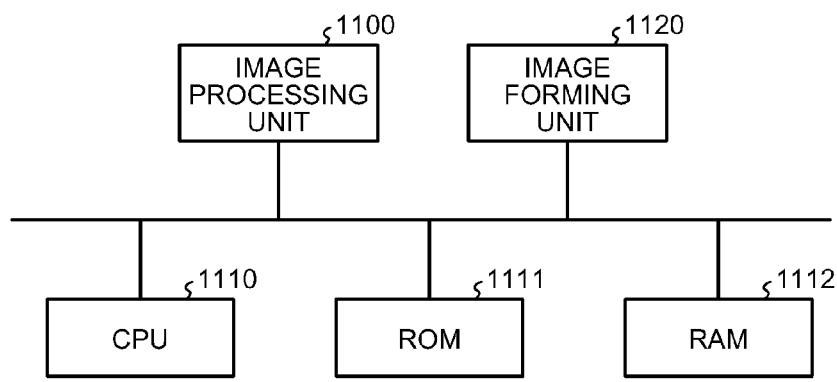
FIG. 15 is a block diagram illustrating a system structure of an image forming apparatus according to a second embodiment.

FIG. 15 is a block diagram illustrating a system structure of an image forming apparatus according to a second embodiment. The image forming apparatus is a copier, a printer such as a laser printer, a facsimile, or a multifunction peripheral that includes at least one of copying, printing, and facsimile functions, for example. The image forming apparatus may output a single color or a color obtained by combination of types of toner of yellow (Y), magenta (M), cyan (C), and black (K). The image forming apparatus includes an image processing unit 1100, a CPU 1110, a ROM 1111, a RAM 1112, and an image forming unit 1120.

Figure 16:
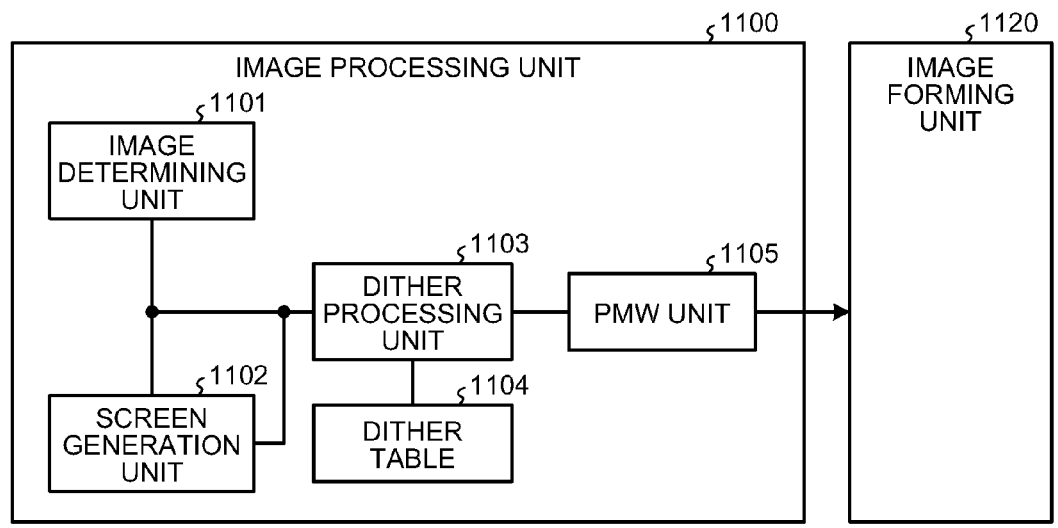
FIG. 16 is a block diagram illustrating a functional structure of an image processing unit.

The image processing unit 1100, which is mounted on a controller board of the image forming apparatus, for example, performs the image processing on received image data and outputs the processed image data to the image forming unit 1120. The image processing unit 1100 has a structure as illustrated in FIG. 16, which is described later, for example. In the image forming apparatus, the CPU 1110 performs a certain control operation, which is described later, in accordance with a control program stored in the ROM 1111 using the RAM 1112 as a working memory.

When the image forming unit 1120 is a laser printer, the image forming unit 1120 includes an optical writing unit including a laser optical system and a writing control unit, and performs laser modulation exposure in accordance with an image signal transmitted from the image processing unit 1110. As a result of the exposure, a latent image is formed on a photoconductor after charging. A desired image is formed on recording paper after developing, transfer, and fixing processes, which are known processes in a typical electrophotography apparatus.

FIG. 16 is a block diagram illustrating the functional structure of the image processing unit 1100. The image processing unit 1100 includes an image determining unit 1101, a screen generation unit 1102, a dither processing unit 1103, a dither table 1104, and a PMW unit 1105.

The image determining unit 1101 determines a gradation value for each certain area in the received image data. The image determining unit 1101 reads, from the received image data, image information (gradation value in) about a half tone region (intermediate gradation region).

The screen generation unit 1102 produces a void dot shape at the center of each of the dots included in a halftone dot pattern in a screen. The halftone dot pattern has an input area rate, which is an area rate of black and white in a dot image, and corresponds to the gradation value, smaller than an appearance value of image defect. The screen generation unit 1102 is described later in detail.

The dither processing unit 1103 determines, from the received image information, the dither pattern to be applied, reads dither pattern data stored in the dither table 1104, and performs the dither processing in accordance with the read dither pattern data. The dither table 1104, which includes a plurality of pieces of dither pattern data, is stored in a storage device such as an HDD.

The PMW unit 1105 performs pulse width modulation (PMW) on the basis of the image data after the dither processing by the dither processing unit 1103 when the image forming unit 120 is a laser printer. The PMW unit 1105, then, sends a signal to an optical writing unit (not illustrated) of the image forming unit 1120 to modulate a laser diode (LD).

A part or the whole of the function of the image processing unit 1110 may be achieved by software or hardware.

FIG. 17 is a block diagram illustrating a functional structure of the screen generation unit 1102. The screen generation unit 1102 includes a halftone dot growth unit 1200, a void dot forming processing unit 1201, and a dot production unit 1202. Those functional units are described later.

A part or the whole of the function of the screen generation unit 1102 may be achieved by software or hardware.

The following describes a dot growth method in a halftone dot screen. In image forming using the electrophotography, the ends of exposure distributions of adjacent dots overlap with each other when the distance between the adjacent dots is small. This overlap causes a certain exposure intensity to be produced on the non-image region (background region). The exposure intensity causes a small latent image potential to be generated on a photoconductor just after charging and the small latent image potential causes toner to adhere on the photoconductor. In such a case, as illustrated in FIG. 13, toner adheres on a place where no toner to be attached. A phenomenon occurs in which toner adheres on a place (non-adhesion region or background region) other than the place on which an image is to be formed. This phenomenon tends to readily appear as the distance between dots in the received dot image is smaller (refer to dl in FIG. 26, which is described later). The instability unique to the electrophotography causes a phenomenon in which toner sometimes adheres and sometimes does not adhere on a place on which no toner is to be attached when the distance between the dots is a certain specific distance, thereby resulting in the occurrence of poor image quality such as a background fog.

The following describes a conventional growth method of a halftone dot screen. In the following description, the growth of dots means the image processing in which a rate of white and black is changed by changing the sizes of dots so as to express a half tone (an intermediate gradation) in a pseudo manner. The growth of dots and the production of dots have the same meaning. The growth or the production is described accordingly.

FIG. 25 is an explanatory view illustrating a conventional halftone dot screen growth method. As illustrated in FIG. 25, the dot images are written in the dot growth order (as the image density is increased) in the halftone dot screen. A growth order of pixels is determined from a pixel closer to the pixel referred to as a growth center (corresponding to the dot growth center, refer to the upper left in FIG. 25) to a peripheral pixel of the growth center.

As illustrated in FIG. 25, gradations are expressed by growing the dots using the growth center (refer to the upper left) as a reference. The larger the gradation value is, the smaller the distance between dots is. In an intermediate gradation, the poor image quality frequently occurs, thereby causing toner adhesion to be unstable. The dot growth method, thus, needs to be changed in order to enhance the image stability in the intermediate gradation in the halftone dot screen.

Figure 26:
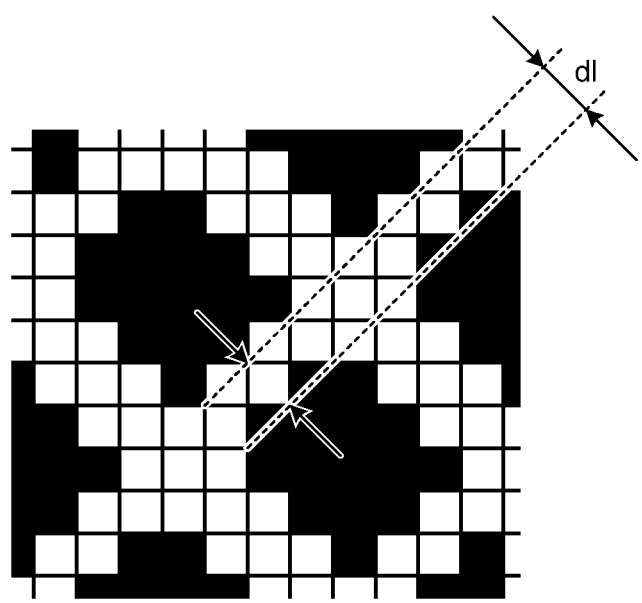
FIG. 26 is an explanatory view illustrating the inter-dot distance when an input area rate is about 50%.

Regardless of any dot growth methods, a gradation is present in which the distance between dots becomes small and the image stability deteriorates. The dot growth method, however, can reduce the number of gradations in which the image stability deteriorates by changing the procedure. In the conventional dot screen growth method, many gradations in which the distance between dots causes the image stability in the non-toner adhesion regions to deteriorate are included in the intermediate gradation range. As a result, the image stability is poor in the intermediate gradation range. It is confirmed that the poor image quality frequently occurs when a distance between the pixels, which pixels are the dots included in the halftone dot image, or what is called an inter-dot distance dl illustrated in FIG. 26, is equal to or smaller than 50 µm.

The screen generation unit 1102 in the embodiment enhances the image stability in the intermediate gradation in the following manner. The halftone dot growth unit 1200 grows the dots in a halftone dot shape until the inter-dot distance becomes about 50 µm. The void dot forming processing unit 1201 starts the switching of the dot shape from the halftone dot shape to the void dot shape when the inter-dot distance becomes about 50 µm. The switching to the void dot shape is completed by the time when the input area rate is around 40%, at which it is confirmed that the image defect occurs. After the void dot forming processing unit 1201 completes the switching to the void dot shape, the dot production unit 1202 produces the dots so as to shrink the void dot regions.

The halftone dot growth unit 1200 grows the dots in the dot image in the halftone dot patterns until the inter-dot distance becomes about 50 µm in the screens in which the input area rate, which is the area rate of black and white in the dot image, is equal to or smaller than 40%, and thereafter causes the dots to come to be connected (refer to FIG. 20, which is described later).

The void dot forming processing unit 1201 grows the dots surrounding the void dot region such that the short diameter is as large as possible and the peripheral length of the void dot shape is as small as possible in the void dot pattern used in a void dot screen having an input area rate equal to or larger than 40% (refer to FIG. 20, which is described later).

The void dot forming processing unit 1201 forms the void dot regions using a bridged structure in patterns used for switching from the halftone dot pattern to the void dot shape (refer to FIG. 21, which is described later).

The void dot forming processing unit 1201 forms the bridged structure first in a direction on a large screen angle side in the bridged structure in the patterns for the switching from the halftone dot pattern to the void dot shape (refer to FIG. 21, which is described later).

The following describes the specific examples of the respective functional units with reference to the attached drawings. FIG. 18 is an explanatory view illustrating the dot shape and an example of the void dot shape. The void dot shape illustrated at (b) in FIG. 18 is like a reversed shape of the dot shape A illustrated at (a) in FIG. 18. The use of the void dot shape of B can further reduce the number of gradations in which the inter-dot distance is smaller than the halftone dot shape method, which is the conventional dot screen growth method.

Figure 19:
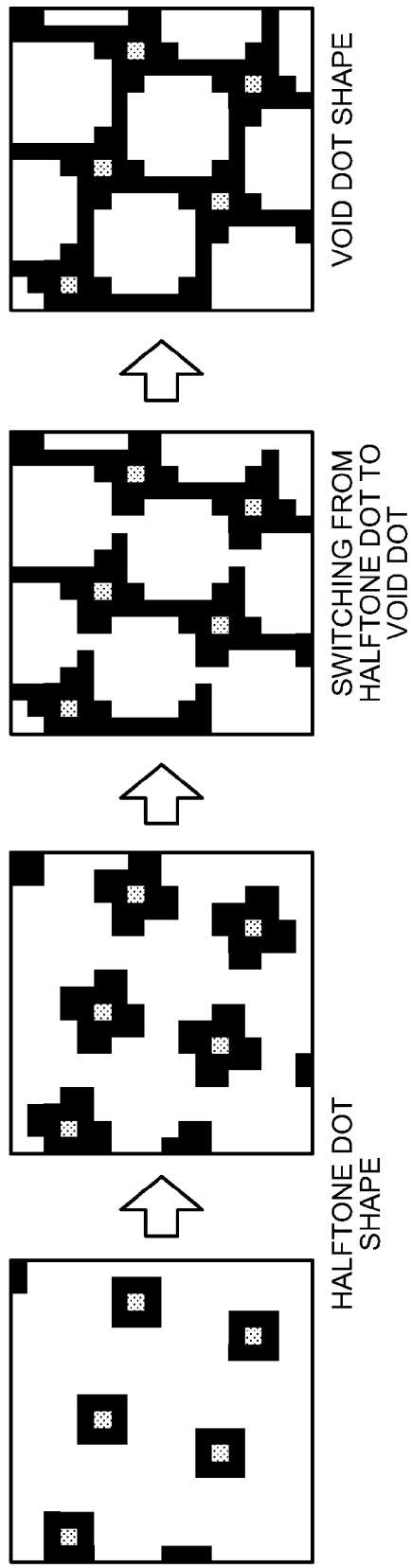
FIG. 19 is an explanatory view illustrating an example of switching from a halftone dot shape the void dot shape.

The halftone dot growth unit 1200 grows the dots in the halftone dot shape until the inter-dot distance becomes about 50 µm, and then the shape is switched to the void dot shape grown by the void dot forming processing unit 201. In the switching from the halftone dot shape to the void dot shape, the inter-dot distance is reduced as illustrated in FIG. 19, thereby causing the image stability to be poor.

The banding is one of the abnormal images (image defects) observed in the electrophotography image forming apparatus. The banding is zonal density unevenness appearing in a half tone region (an intermediate gradation region) in an image. The banding is most conspicuous when the input area rate is around 50% (refer to FIG. 13). When the switching to the void dot shape is performed around the gradation, the banding appears conspicuously. To prevent the occurrence of the image defect referred to as banding, the void dot forming processing unit 1201 completes the switching to the void dot shape by the time when the input area rate is around 40%, at which it is confirmed that the image defect such as the banding occurs.

Figure 20:
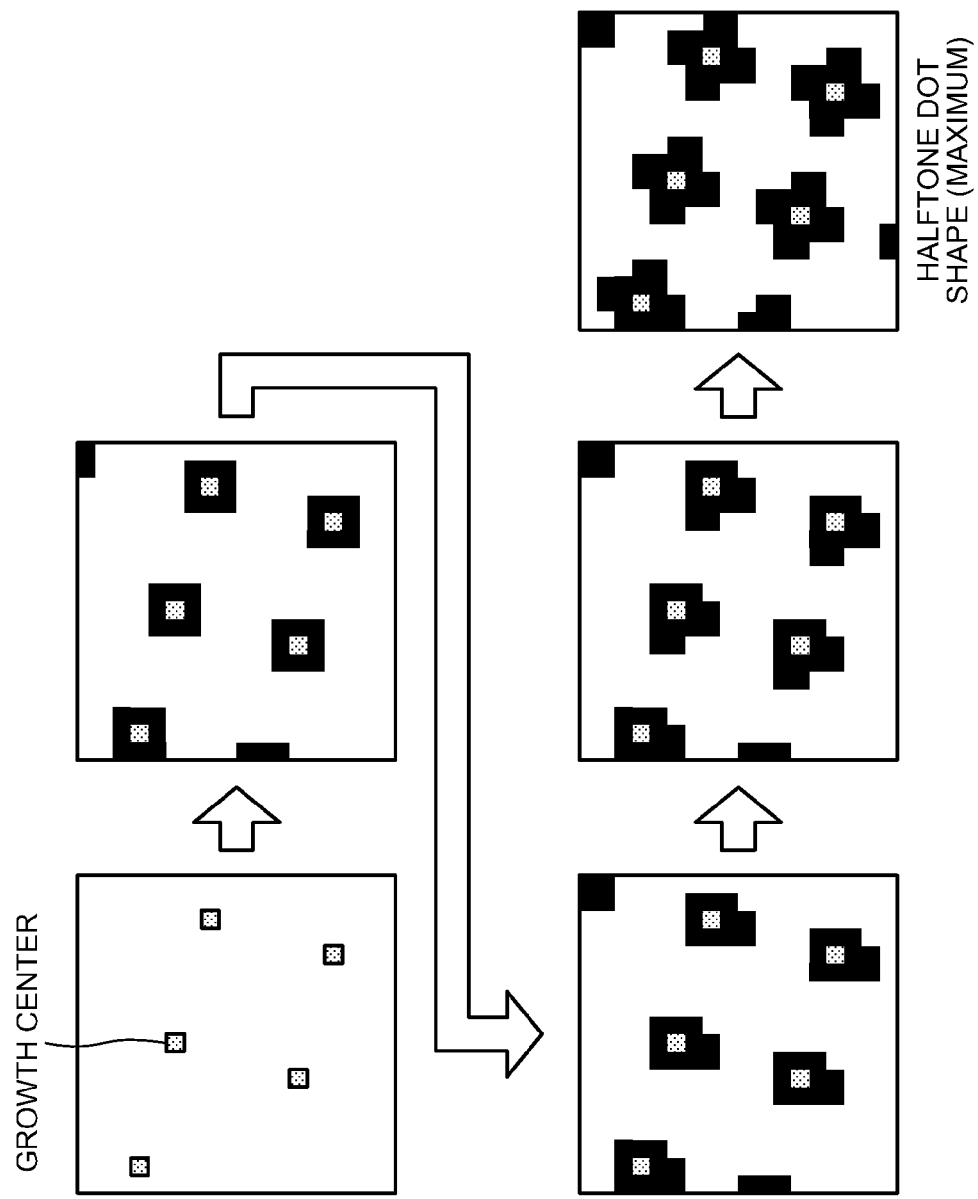
FIG. 20 is an explanatory view illustrating an example of a dot growth method until an inter-dot distance is equal to or smaller than 50 μm.

FIG. 20 is an explanatory view illustrating an example of the dot growth method until the inter-dot distance is equal to or smaller than 50 μm. The halftone dot growth unit 1200 grows the dots, as sequentially illustrated from the left side in FIG. 20, using the conventional halftone dot shape method until the inter-dot distance becomes about 50 μm. For example, when resolution is 600 dot per inch (dpi), the dots are grown until the inter-dot distance is one dot because one dot is nearly equal to 42 μm. When resolution is 1200 dpi, the dots are grown in the halftone dot shape until the inter-dot distance is two dots because one dot is nearly equal to 21 μm.

In the switching from the halftone dot shape to the void dot shape, the inter-dot distance is reduced, thereby causing the image stability to tend to be poor. It is, thus, necessary for reducing the number of gradations in which the image quality and the stability deteriorate to complete the switching quickly. For the purpose of the quick completion, the bridged structure illustrated in FIG. 21 is used.

Figure 21:
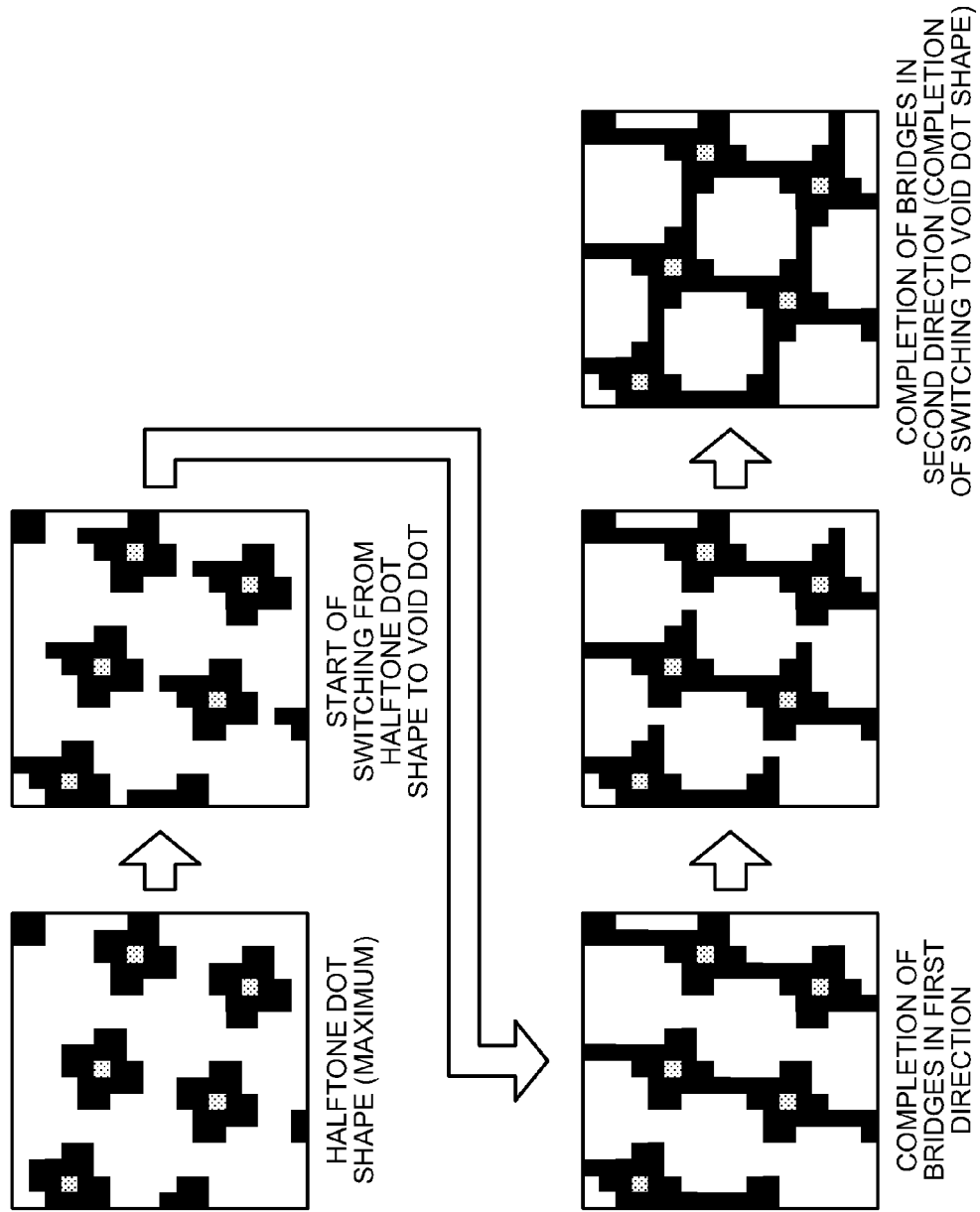
FIG. 21 is an explanatory view illustrating an example of the dot growth method for the switching from the halftone dot shape to the void dot shape.
Figure 22:
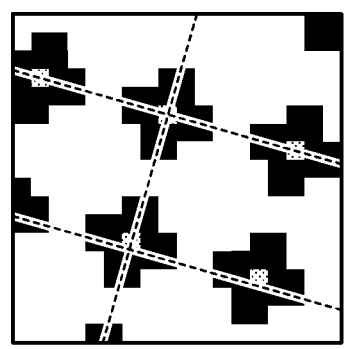
FIG. 22 is an explanatory view illustrating a relation between the halftone dot shape and a screen angle.

FIG. 21 is an explanatory view illustrating an example of the dot growth for switching from the halftone dot shape to the void dot shape. FIG. 22 is an explanatory view illustrating a relation between the halftone dot shape and the screen angle. As illustrated in FIG. 22, the dot screen has two screen angles, one of which is larger than the other in its nature. The bridged structure is first formed at the large screen angle. As illustrated in FIG. 21, the shape similar to the line screen shape is formed when the bridges are formed in the first direction. The reason why such a similar shape is formed is that, in the line screen, the larger the screen angle is, the higher the image stability is. After the completion of the forming of the bridges at the large screen angle, the bridge structure is completed at the small screen angle. As a result, the switching to the void dot shape is completed.

In the example illustrated in FIG. 21, after the halftone dot shape becomes maximum, the switching from the halftone dot shape to the void dot shape starts. In the switching, the forming of the bridges in the first direction is completed, and then the forming of the bridges in the second direction is completed. As a result, the switching to the void dot shape is completed.

Figure 23:
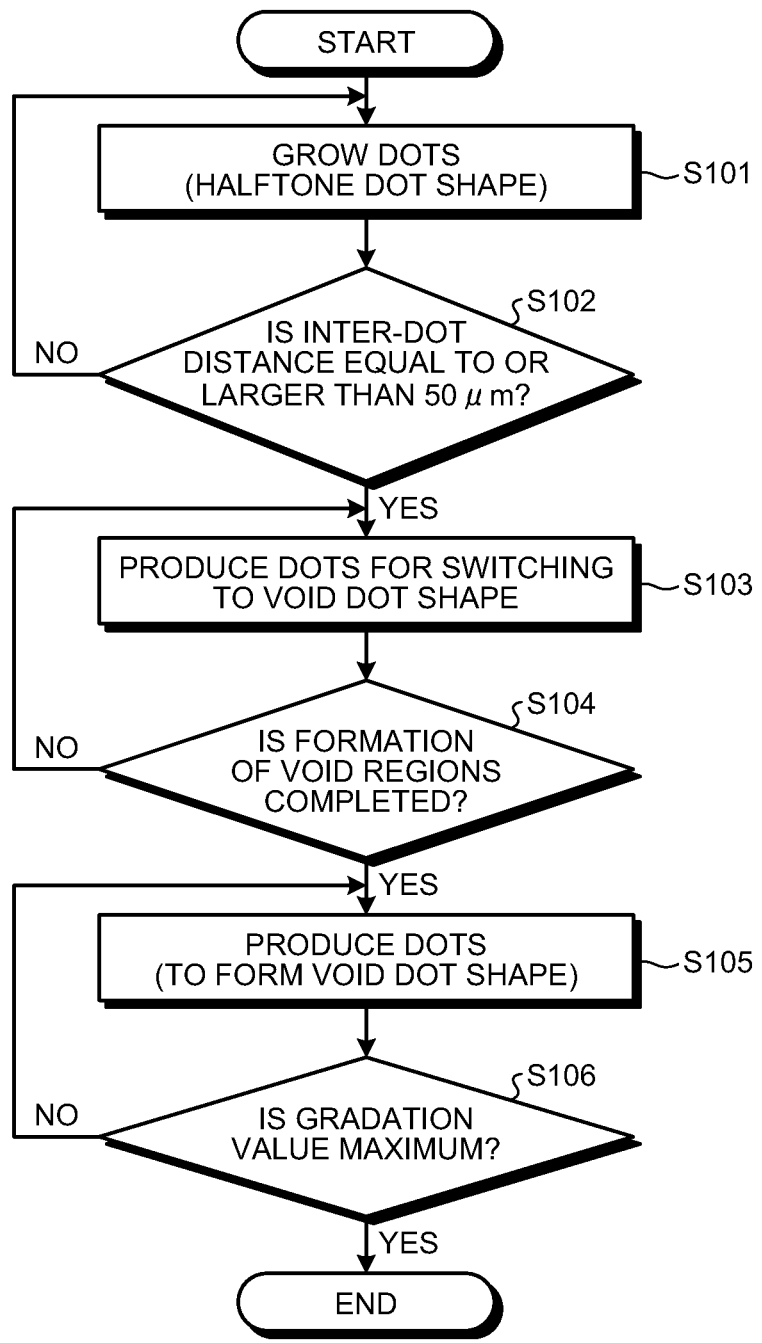
FIG. 23 is a flowchart illustrating an example of processing to produce the screen.

FIG. 23 is a flowchart illustrating an example of the screen production processing according to the second embodiment. The screen production processing is performed by the screen generation unit 1102. The halftone dot growth unit 1200 grows the dots in accordance with the gradation value of the received image in the same manner as the conventional halftone dot screen (step S101). The halftone dot growth unit 1200 determines whether the inter-dot distance is larger than 50 μm (step S102). If the inter-dot distance is larger than 50 μm (Yes at step S102), the processing proceeds to step S103. If the inter-dot distance is smaller than 50 μm (No at step S102), the processing returns to step S101, at which the processing is performed. In this way, the halftone dot growth unit 1200 grows the dots until the inter-dot distance becomes about 50 μm in the same manner as the conventional halftone dot screen.

The void dot forming processing unit 1201 produces the dots so as to perform the switching from the halftone dot shape to the void dot shape when the inter-dot distance reaches about 50 μm (step S103). It is determined whether the forming of the void regions is completed (step S104). If the forming of the void regions is completed (Yes at step S104), the processing proceeds to step S105. If the forming of the void regions is not yet completed (No at step S104), the processing returns to step S103, at which the processing is performed. In this way, the void dot forming processing unit 1201 produces the dots until the protrusions of the dots are connected into lines in which the protrusions are adjacent to each other, and the void dot regions are formed.

At step S105, the dot production unit 1202 produces the dots surrounding the void dot regions such that the short diameter is as large as possible and the peripheral length of each void dot region is as small as possible. It is determined whether the gradation value is maximum (step S106). If the gradation value is maximum (Yes at step S106), the processing ends. If the gradation value is not yet maximum (No at step S106), the processing returns to step S105. In this way, the dot production unit 1202 produces the dots until the solid image is formed.

Figure 24:
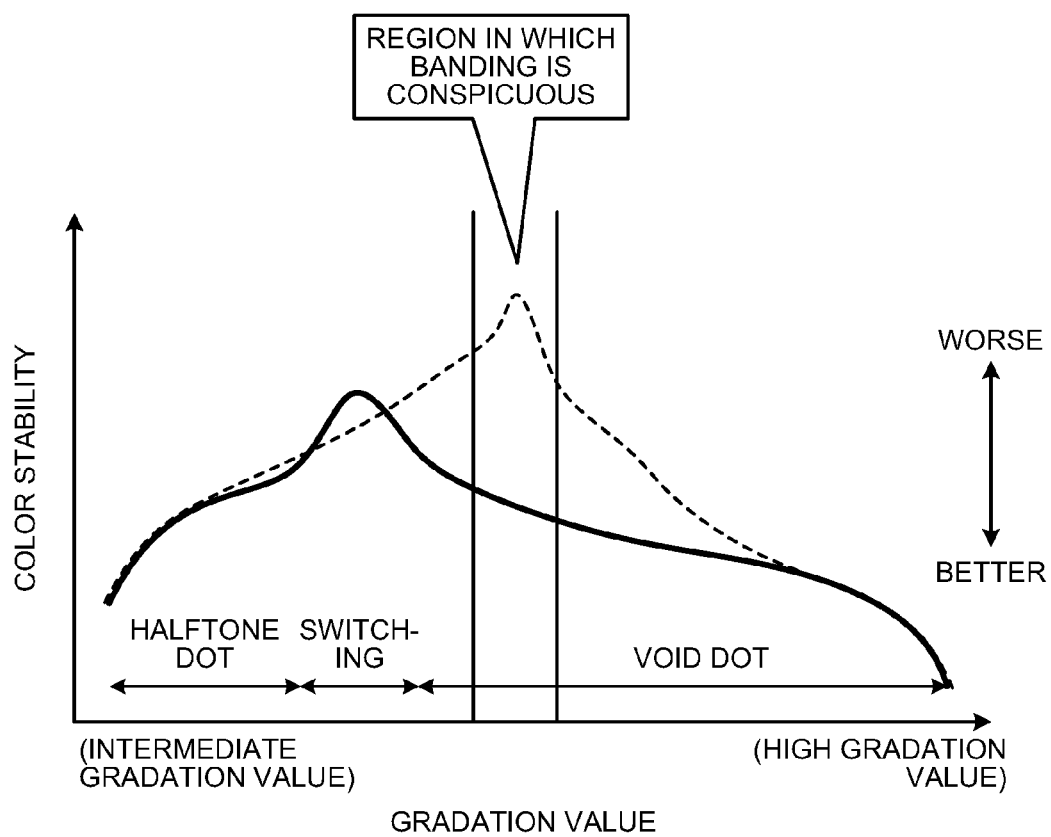
FIG. 24 is a graph illustrating image stability in the conventional halftone dot screen processing and the image stability in the halftone dot screen processing in the second embodiment.

FIG. 24 is a graph illustrating the image stability in the conventional halftone dot screen processing and the image stability in the halftone dot screen processing in the second embodiment. In FIG. 24, the abscissa axis represents the gradation value while the ordinate axis represents the color stability (ranging from better to worse). It can be seen from FIG. 24 that the conventional halftone dot screen processing (the graph indicated by the broken line) has a problem of color stability in the intermediate gradation. Furthermore, the degree of banding is worse because the gradation at which the color stability is worst and the gradations in which the banding is conspicuous overlap with each other. In FIG. 24, the central part (near the top of the parabola) of the graph is the region in which the banding, which is zonal density unevenness appearing in a half tone region (intermediate gradation region) in an image, is conspicuous.

The processing performed by the screen generation unit 1102 in the embodiment is illustrated by the graph indicated by the actual line in FIG. 24. The processing includes three image processing functions as follows: processing to form the halftone dot shape, the processing to switch the shape from the halftone dot shape to the void dot shape, and the processing to form the void dot shape. It can be seen from FIG. 24 that the image processing functions solve the problem of the conventional halftone dot screen processing.

The computer program executed by the image processing apparatus in the embodiment is embedded and provided in the ROM 1111, for example. The computer program may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program executed in the embodiment may be stored in a computer connected to a network such as the Internet and provided by being downloaded via the network. The computer program executed in the embodiment may be provided or distributed via a network such as the Internet.

The computer program executed in the embodiment has a module structure that includes the respective units described above. In practical hardware, the CPU (processor) 1110 reads out the computer program from the ROM 1111 and executes the program, so that the units are loaded into a main storage unit, and the units are formed in the main storage unit.

An embodiment has an advantage that the image stability in a range from the intermediate gradation to the high gradation is improved and an increase in memory capacity and an increase in image processing time are prevented, and an image defect is prevented from being more conspicuous even when both of the line screen and the void dot screen are used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrophotography apparatus, comprising:
a storage unit storing therein:
a first dither pattern group that includes a plurality of dither patterns each of which corresponds to a gradation value in a first range and that are formed by line screens being line patterns in which widths of lines are increased with an increase in the gradation value,
a second dither pattern group that includes a plurality of dither patterns each of which corresponds to a gradation value in a second range higher than the gradation value in the first range, and that are formed by void dot screens being patterns in which number of dots is increased and void regions surrounded by the dots are decreased with an increase in the gradation value, and
a third dither pattern group that includes a plurality of dither patterns for switching from the line screen to the void dot screen, switching to the void dot screen being completed before a first reference gradation value at which an image defect occurs for received image data is reached;
an image determining unit configured to determine a gradation value for each certain area in the received image data; and
a gradation processing unit configured to select a dither pattern corresponding to a gradation value out of the first dither pattern group, the second dither pattern group, and the third dither pattern group,
wherein the third dither pattern group includes a plurality of dither patterns each formed by a pattern in which adjacent lines come to be connected with an increase in the widths of the lines in such a manner that connections come to be gradually connected from tips of the connections each having a tapered shape toward the tip thereof with an increase in the gradation value from a second reference gradation value.

2. The electrophotography apparatus according to claim 1, wherein the second reference gradation value is a gradation value that corresponds to a minimum distance between lines, the minimum distance allowing an adhesion area of a non-image region between the lines to be stable.

3. The electrophotography apparatus according to claim 1, wherein the third dither pattern group includes the dither patterns in which the adjacent lines comes to be connected in a direction perpendicular to a direction of the lines.

4. The electrophotography apparatus according to claim 3, wherein the third dither pattern group includes a dither pattern formed by a pattern in which a diameter of a void region in a void dot pattern is equal to a distance between the adjacent lines when the adjacent lines are connected at the tips.

* * * * *